(12) United States Patent
Yan et al.

(10) Patent No.: US 6,760,191 B1
(45) Date of Patent: Jul. 6, 2004

(54) INTERNAL HEAT DISSIPATER USED TO REDUCE SLIDER AND WRITE POLE THERMAL PROTRUSION FOR THIN FILM RECORDING HEADS

(75) Inventors: Wentao Yan, Fremont, CA (US); David E. Fowler, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 211 days.

(21) Appl. No.: 10/067,566

(22) Filed: Feb. 4, 2002

Related U.S. Application Data

(60) Provisional application No. 60/298,965, filed on Jun. 18, 2001.

(51) Int. Cl.⁷ .............................. G11B 17/02; G11B 5/40
(52) U.S. Cl. .................................... 360/128; 360/97.02
(58) Field of Search ............................. 360/128, 97.01, 360/97.02, 97.03, 234.3

(56) References Cited

U.S. PATENT DOCUMENTS 5,965,840 A * 10/1999 Nagarajan et al. .......... 136/203
6,105,381 A * 8/2000 Ghoshal ..................... 62/259.2
6,452,740 B1 * 9/2002 Ghoshal .................. 360/97.02
6,597,544 B2 * 7/2003 Ghoshal ..................... 360/317

OTHER PUBLICATIONS

U.S. patent application Ser. No. 60/269,774, Nguyen et al., filed Feb. 16, 2001.
B.K. Gupta et al., "Head Design Considerations for Lower Thermal PLE Tip Recession and Alumina Overcoat Protrusion," May 2000, Tribology International, vol. 33, pp. 309–314.

* cited by examiner

Primary Examiner—Robert S. Tupper
(74) Attorney, Agent, or Firm—James P. Broder; Steven G. Roeder

(57) ABSTRACT

A head suspension assembly for a disk drive that inhibits thermal pole tip protrusion includes a slider assembly having a slider exterior surface including a trailing surface, a slider interior region that is defined by the slider exterior surface, and a write head having an electrically coupled write coil positioned within the slider interior region. The write coil generates heat during write operations of the disk drive. The slider assembly also includes a heat dissipater positioned substantially within the slider interior region. The heat dissipater is electrically isolated from the write coil, and has a thermal conductivity of at least approximately 50 W/mK.

53 Claims, 5 Drawing Sheets

INTERNAL HEAT DISSIPATER USED TO REDUCE SLIDER AND WRITE POLE THERMAL PROTRUSION FOR THIN FILM RECORDING HEADS

RELATED APPLICATION

This Application claims the benefit on U.S. Provisional Application Serial No. 60/298,965 filed on Jun. 18, 2001. The contents of U.S. Provisional Application Serial No. 60/298,965 are incorporated herein by reference.

FIELD OF THE INVENTION

The present invention relates generally to disk drives for storing data. More specifically, the present invention relates to a head suspension assembly for a disk drive.

BACKGROUND

Disk drives are widely used in computers and data processing systems for storing information in digital form. The disk drive typically includes one or more storage disks and a head stack assembly having an actuator motor, an E-block, and one or more head suspension assemblies. The actuator motor moves the E-block relative to the storage disks. The E-block includes one or more actuator arms that extend between the storage disks. Up to two head suspension assemblies cantilever from each actuator arm, and extend to near a corresponding disk surface of the storage disks. The disk surfaces are divided into a plurality of narrow, annular regions of different radii, commonly referred to as "tracks". In an effort to increase the storage capacity of the disk drive, track density is ever-increasing. The more densely configured tracks necessitate less room for error in positioning the head suspension assemblies relative to the storage disks.

Each head suspension assembly includes a slider assembly having a generally rectangular body section and a transducer section that is secured to the body section along a rear body surface of the body section. The transducer section is formed from a plurality of distinct layers, each being sequentially added onto the preceding layer. The first layer of the transducer section that is secured to the rear body surface of the body section is typically an electrically insulating undercoat layer. Other layers are subsequently added to form the transducer section. Among other components, these layers form a read/write head that transfers information between a drive circuitry and the storage disk when positioned over one of the disk surfaces of the storage disk.

The read/write head typically includes (i) a read head, and (ii) a write head having an electrically conductive write coil, a leading pole having a leading pole tip, a trailing pole having a trailing pole tip, and one or more electrical insulating layers that surround the write coil. Further, a yoke spans between the leading pole and the trailing pole. Present write coils often include a single coil wound around the yoke in two layers. The poles can be formed from various relatively high permeability metal materials such as a nickel-iron alloy. During writing to the storage disk, current flows through the write coil in alternating directions. The current causes the write coil to generate a relatively significant amount of heat. This heat reaches nearby portions of the transducer section, including the poles and ultimately the pole tips. The heat causes the pole tips and/or other portions of the transducer section to expand and protrude in a direction toward the disk surface of the storage disk. This phenomenon is known as "thermal protrusion", also sometimes referred to as "thermal pole tip protrusion".

Additionally, the layers surrounding the read/write head, which can be formed from sputtered aluminum oxide (alumina), expand in response to the heat generated in the write coil. In conventional disk drives, the bottom surface of the slider assembly is typically configured as an air bearing surface (ABS). The expansion of the overcoat layer causes this material to protrude toward the disk of surface in the vicinity in and around the write head, extending to the air bearing surface. This protrusion can cause one or more alumina portions of the air bearing surface to become the points that are closest to the disk surface, which can result in decreased performance of the disk drive.

Rotation of the storage disk and friction between air and the disk results in a stream of pressurized air flowing past the air bearing surface of the slider assembly. When the net upward force induced by the flow of air is just balanced by the downward force of the slider suspension, the slider is positioned at nearly a constant height above the rotating disk and the slider is said to be flying. The separation between the air bearing surface of the slider assembly and the disk surface during rotation of the storage disk is referred to as the flying height. As a consequence of higher linear and track densities, the flying height, and thus the distance between the write head and the storage disk, must be extremely small to ensure accurate data transfer. Currently, flying heights can be 25 nanometers or less. During a write operation, thermal protrusion causes the force-balanced distance between the lowest point on the slider air bearing surface and the storage disk to be significantly less than the preferred flying height. With relatively low flying heights, thermal protrusion can result in the lowest point of the air bearing surface physically contacting the storage disk. This contact can move the slider off track, cause damage to the slider assembly, and cause damage to the storage disk and/or a permanent loss of data.

Attempts to limit the extent of thermal protrusion include decreasing resistance in the write coil, thereby reducing the amount of heat generated in the transducer section. Resistance can be decreased by providing a more tightly wound write coil and using thicker coil materials. Another attempt to reduce the adverse effects of thermal protrusion includes using a single layer coil rather than the conventional two-layer coil, in order to more widely distribute the heat of the coil to a larger volume of material. A further attempt to inhibit thermal protrusion includes replacing one of the insulating layers of the transducer section, which normally includes a photoresist material of relatively high coefficient of thermal expansion, with material having a lower coefficient of thermal expansion, such as alumina. Still another attempt to decrease thermal protrusion includes using a thinner undercoat layer between the body section and the write head to decrease the resistance to thermal conduction to the mass of the slider body. Unfortunately, although these attempts have met with limited success, they have not been altogether satisfactory at reducing and/or inhibiting thermal pole tip protrusion.

In light of the above, the need exists to provide a head suspension assembly that reduces thermal protrusion of the transducer section toward the storage disk, thereby decreasing the likelihood of off track writing, damage to the read/write head and/or loss of data from the storage disk. Another need exists to manufacture a reliable, efficient and cost effective disk drive that provides increased accuracy during data transfer.

SUMMARY

The present invention is directed to a disk drive and a head suspension assembly for a disk drive. In one embodiment, the head suspension assembly includes a slider assembly having a slider exterior surface including a bottom surface and a trailing surface, a slider interior region including a body section and a transducer section, and a read/write head having a trailing pole and an electrically coupled write coil positioned within the slider interior region. The write coil generates heat during write operations of the disk drive. The slider assembly also includes a heat dissipater positioned substantially within the slider interior region. The heat dissipater is electrically isolated from the read/write head, and the heat dissipater has a thermal conductivity of at least approximately 50 W/mK. With this design, the heat dissipater dissipates heat generated by the write coil by conducting the heat away from the read/write head and the surrounding regions of the transducer section to other regions of the slider assembly.

The heat dissipater can include a plurality of spaced apart dissipater layers. Two or more dissipater layers can be substantially parallel to each other and/or to the trailing surface of the slider exterior surface. In another embodiment, the heat dissipater includes a plurality of radial projections that extend radially away from the trailing pole. By increasing the surface area of the heat dissipater, a greater amount of the heat generated by the write coil can be transferred away from the bottom surface at and/or near the read/write head. The dissipation of heat away from the bottom surface results in a reduction in the deformation of the bottom surface at and/or near the read/write head.

The present invention is also directed to a method for dissipating heat within a slider assembly of a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

The present invention provides a method and apparatus for dissipating heat generated by a write coil of a read/write head in a slider assembly. By transferring the heat to regions of the slider assembly remote from the write head, the present invention reduces thermal protrusion, thereby decreasing the likelihood of off-track writing, damage to the write head and/or loss of data.

Figure 1:
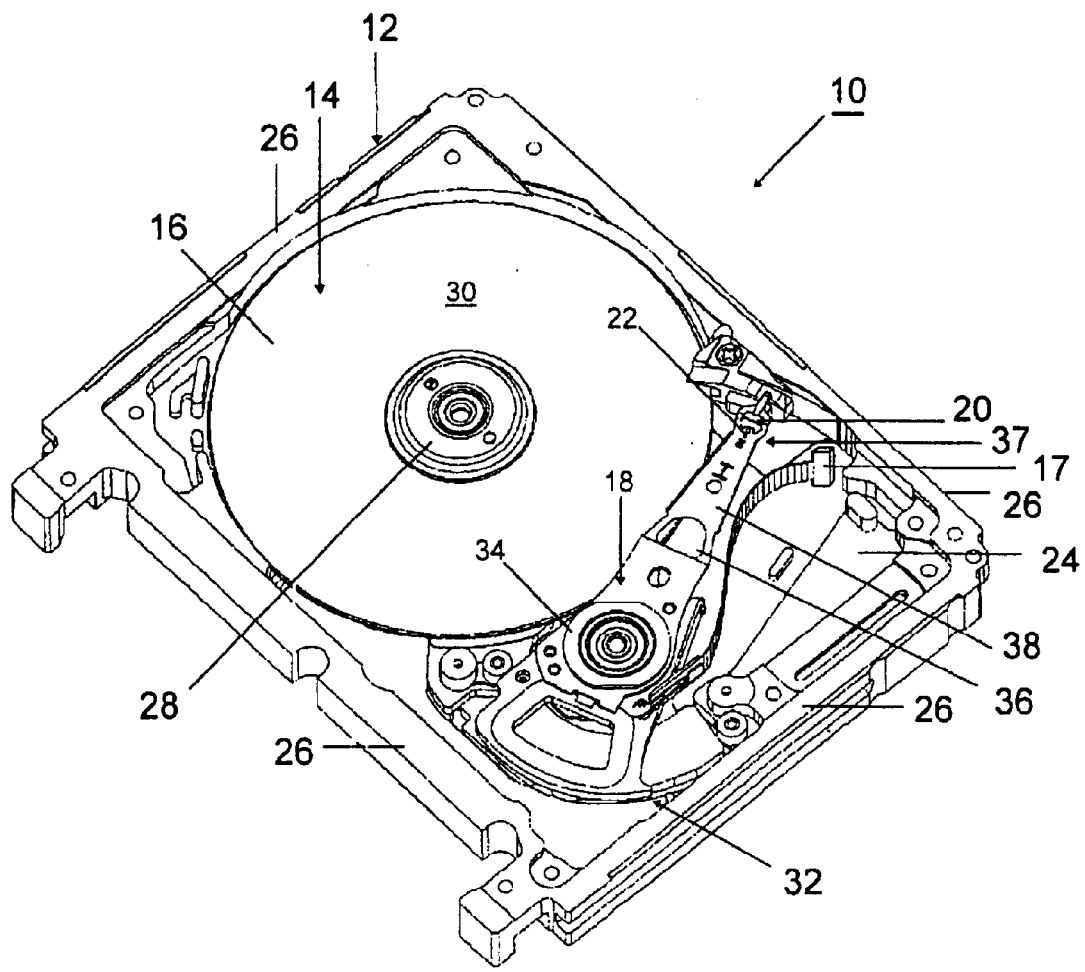
FIG. 1 is a perspective view of a disk drive having features of the present invention.

FIG. 1 illustrates a perspective view of a disk drive 10 that includes (i) a drive housing 12, (ii) a disk assembly 14 having one or more storage disks 16, a controller 17, and (iii) a head stack assembly 18 including one or more head suspension assemblies 20, each having a slider assembly 22.

The drive housing 12 retains the various components of the disk drive 10. The drive housing 12, illustrated in FIG. 1, includes a base 24 and four side walls 26. A typical drive housing 12 also includes a cover (not shown for clarity).

In FIG. 1, the disk assembly 14 includes a disk spindle 28 and one magnetic storage disk 16. The disk spindle 28 is rotatably mounted to the drive housing 12. The storage disk 16 is fixedly secured to the disk spindle 28. The storage disk 16 includes one or more disk surfaces 30 that are adapted to store data. Alternatively, the disk assembly 14 can include a plurality of spaced-apart storage disks 16.

The controller 17 controls the flow of electricity to the slider assembly 22 during a write operation. Further, the controller 17 receives electrical signals from the slider assembly 22 during a read operation. Although the controller illustrated in FIG. 1 is shown within the drive housing 12 of the disk drive 10, the positioning of the controller 17 can vary. For example, the controller can be positioned on an opposing side of the base 24, within a printed circuit board assembly (not shown).

The head stack assembly 18 illustrated in FIG. 1 includes an actuator motor 32, an actuator hub 34, one head suspension assembly 20 and a single actuator arm 36. In this embodiment, the actuator motor 32 rotates the actuator hub 34, the actuator arm 36 and the head suspension assembly 20 relative to the storage disk 16. Alternatively, the head stack assembly 18 can include a plurality of actuator arms 36 that each supports up to two head suspension assemblies 20. Each head suspension assembly 20 includes the slider assembly 22 and a suspension 37 having a load beam 38 and a flexure (not shown). The suspension 37 is secured to the actuator arm 36, and supports the slider assembly 22 proximate one of the disk surfaces 30 of the storage disk 16.

Figure 2:
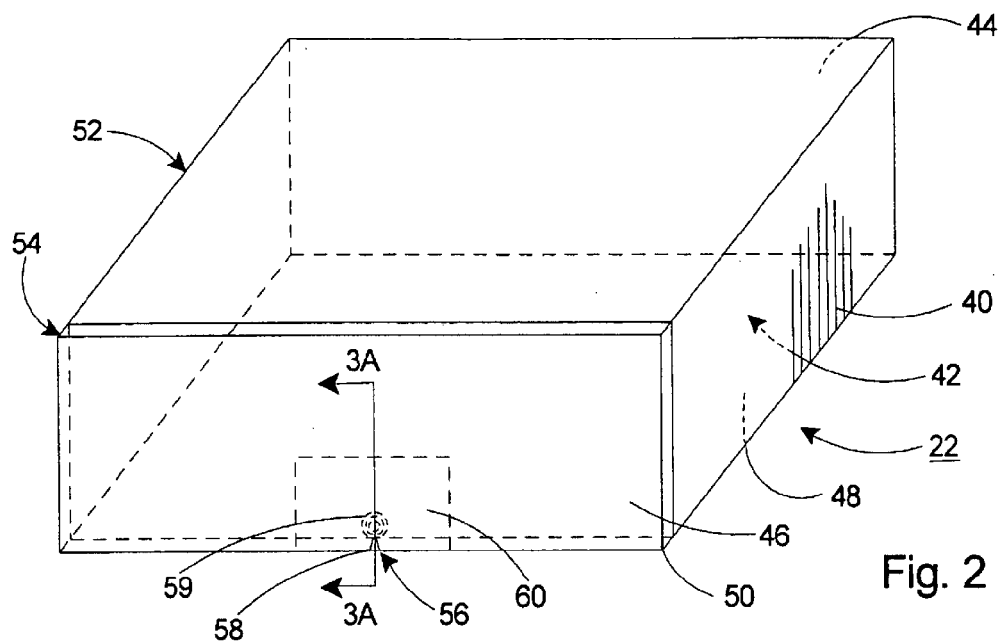
FIG. 2 is a perspective view of a slider assembly having features of the present invention.

FIG. 2 illustrates a rear perspective view of a first embodiment of the slider assembly 22. The design of the slider assembly 22 can vary to suit the design requirements of the disk drive 10. The slider assembly 22 includes a slider exterior surface 40 and a slider interior region 42. The slider exterior surface 40 defines the bounds of the slider interior region 42. The exterior surface 40 includes a leading surface 44, an opposed trailing surface 46 and a bottom surface 48, which is also referred to herein as an air bearing surface. The separation between the air bearing surface 48 and the nearest disk surface (not shown in FIG. 2) during rotation of the storage disk is referred to as the flying height. The nominal flying height can vary depending upon the requirements of the disk drive 10. Today, a typical flying height can be approximately 13 nanometers.

Further, the slider assembly 22 includes a body section 52 and a transducer section 54 having a read/write head 56 that transfers information to and from the storage disk 16. The body section 52 is generally rectangular shaped and volumetrically represents the vast majority of the slider assembly 22. For example, the body section 52 can comprise approximately 95 percent or more of the total volume of the slider assembly 22. The body section 52 can be formed from various ceramic materials including a composition of alumina and titanium-carbide, for instance. The transducer section 54 is also generally rectangular shaped and is positioned toward the back end of the slider assembly 22, as illustrated in FIG. 2.

The read/write head 56 includes a magneto-resistive head 57 (also known as a read head or an MR head, shown in FIG.

3A), and a write head 58 having a write coil 59 (shown in phantom in FIG. 2) that is in electrical communication with the controller 17 (not shown in FIG. 2). Although the write coil 59 is shown substantially centrally positioned along the transducer section 54 of the slider assembly 22, the write coil 59 can be positioned on either side of the center of the transducer section 54. The transducer section 54 also includes a heat dissipater 60 (shown in phantom in FIG. 2) that dissipates heat generated by the write coil 59 via thermal conduction to other areas of the slider assembly 22, as described in greater detail below.

Figure 3A:
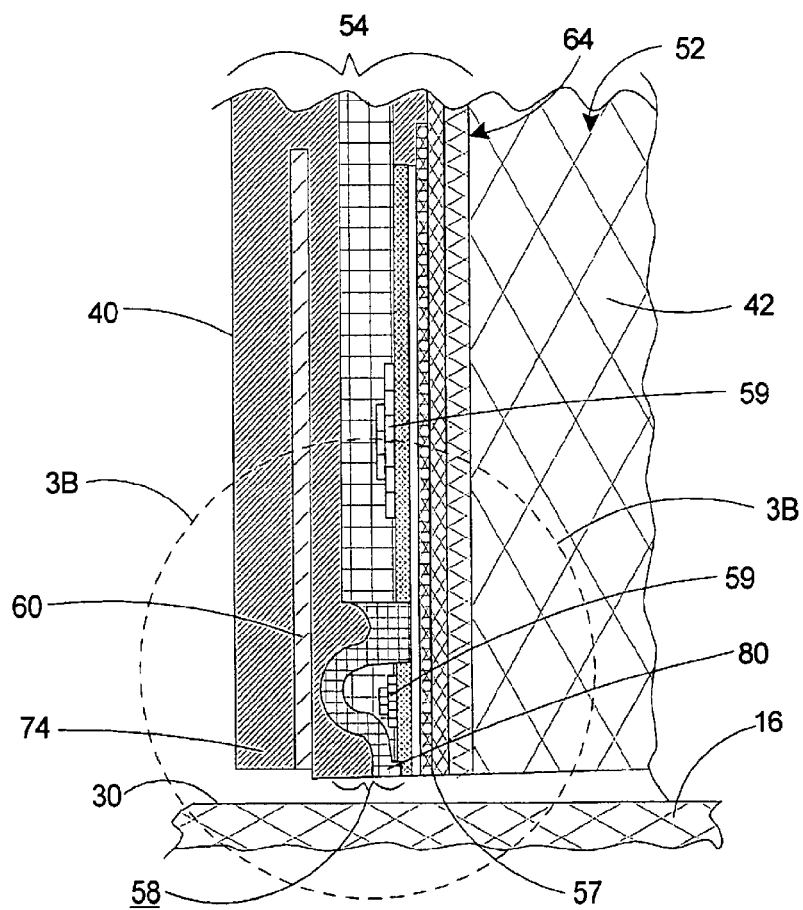
FIG. 3A is a partial cross-sectional view of a portion of a storage disk and a portion of the slider assembly taken at line 3A—3A in FIG. 2.

FIG. 3A is a partial cross-sectional illustration of one embodiment of the slider assembly 22. In this embodiment, the body section 52 includes a rear body surface 64 to which the transducer section 54 is secured. During manufacturing, the transducer section 54 is layered onto the rear body surface 64 of the body section 52. The transducer section 54 includes a plurality of different materials that are successively added in layers to form the components of the transducer section 54 by processes known by those skilled in the art. For example, each layer can be added by electroplate deposition, sputter deposition, or other suitable methods.

Figure 3B:
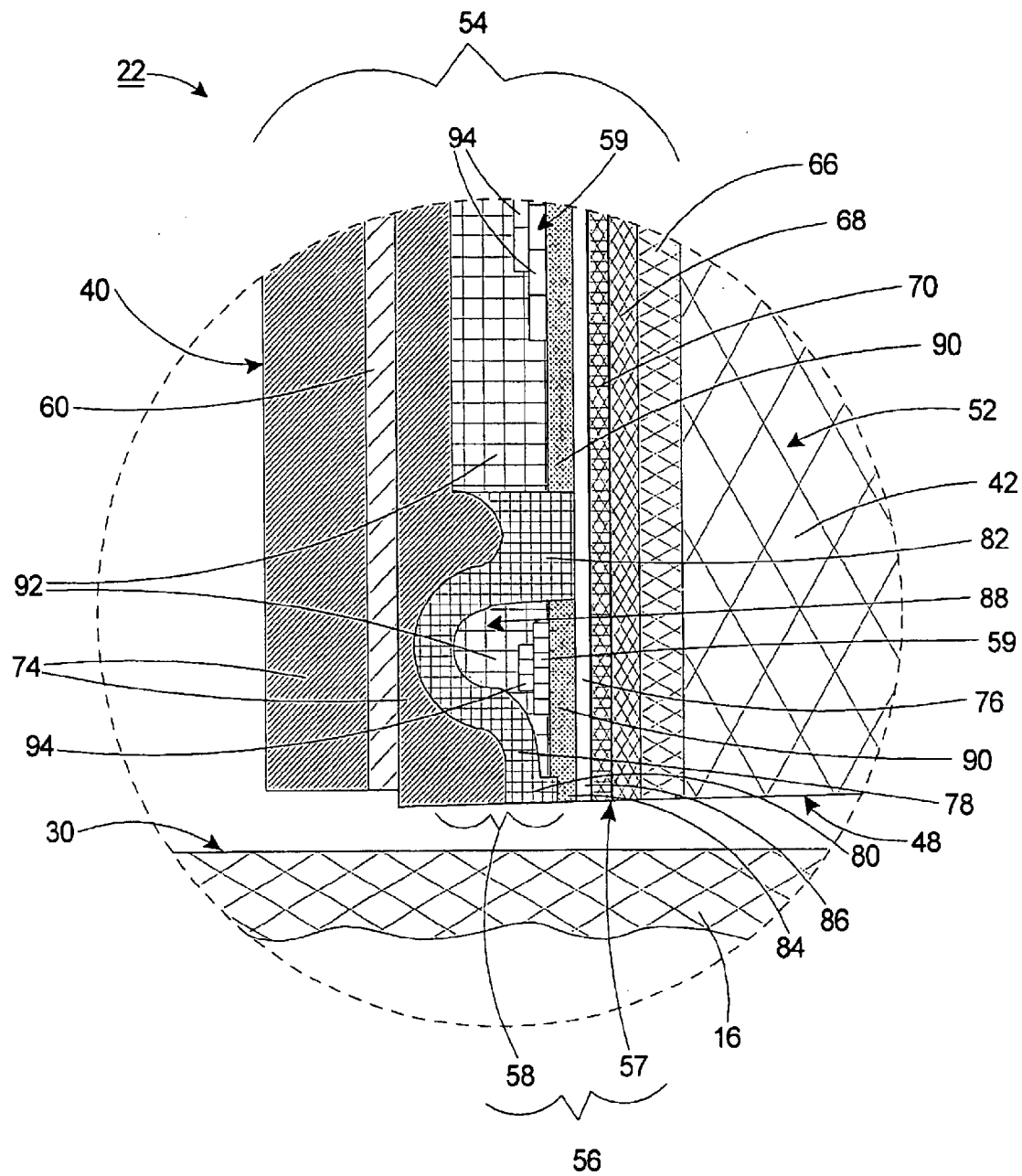
FIG. 3B is an enlarged detail view taken on dashed line 3B in FIG. 3A.

FIG. 3B is an enlarged view of a portion of the slider assembly 22. In this embodiment, the transducer section 54 includes an electrically insulating undercoat layer 66, a first shield 68 and a spaced apart second shield 70, the MR head 57 positioned between the shields 68, 70, the write head 58, an overcoat layer 74 and the heat dissipater 60. The undercoat layer 66 is added directly to the rear body surface 64. The undercoat layer 66 is formed from a suitable material such as alumina, and can have a thickness of between approximately 1.0 and 6.0 microns, although the thickness can be greater or lesser than this, range.

The design and number of the shields 68, 70 can be varied depending upon the requirements of the slider assembly 22. The shields 68, 70 are substantially parallel to each other, and are generally planar. The shields 68, 70 extend away from the air bearing surface 48 into the slider interior region 42, and are separated by a layer of alumina. The shields 68, 70 assist in magnetically separating the MR head 57 from the write head 58. Further, the shields 68, 70 protect the MR head 57 from being influenced by other extraneous magnetic fields (not shown) that may exist proximate the transducer section 54. Each shield 68, 70 is formed from a metallic material such as a nickel-iron alloy, and can have a thickness of between approximately 1.5 and 4.0 microns. The MR head 57 receives and reads information from the rotating storage disk 16, and transmits the information to the controller (not shown in FIG. 3B) for further processing.

The positioning of the write head 58 can be varied to suit the design requirements of the slider assembly 22 and the disk drive 10. The write head 58 includes a leading pole 76, a trailing pole 78 having a trailing pole tip 80, a yoke 82, and a write head gap 84.

In this embodiment, the leading pole 76 is positioned adjacent to, but spaced slightly apart from, the second shield 70. The leading pole 76 is located between the second shield 70 and the trailing surface 46 of the slider assembly 22. A non-magnetic layer, typically alumina, separates the leading pole 76 from the second shield 70. The leading pole 76 is generally planar except near the pole tip 86, and extends approximately from the air bearing surface 48 into the slider interior region 42, substantially parallel to the shields 68, 70. The leading pole 76 includes a leading pole tip 86 positioned proximate the air bearing surface 48. The leading pole 76 can be formed from various metals such as a nickel-iron alloy. The leading pole 76 can have a thickness that is less than approximately 4.0 microns.

As illustrated in FIG. 3B, the trailing pole 78 has a somewhat curved cross-sectional shape. Near the air bearing surface 48, the trailing pole 78 extends toward the leading pole 76, leaving a space between the pole tips 80, 86 known as the write head gap 84. The leading pole 76 and the trailing pole 78 intersect at an area known as the yoke 82, which is the arch between the pole tips 80, 86 in the slider interior region 42. The trailing pole 78 bows away from the leading pole 76 to define an interpole region 88. The trailing pole 78 can be formed from various metals such as a nickel-iron alloy. The trailing pole 78 can have a thickness that is less than approximately 4.0 microns.

In addition, the write head 58 also includes a first insulator layer 90, the write coil 59, and a second insulator layer 92. The first insulator layer 90 is positioned substantially adjacent to the leading pole 76, and extends generally parallel to the leading pole 76. As illustrated in FIG. 3B, a portion of the first insulator layer 90 is positioned within the interpole region 88. The first insulator layer 90 can be formed from various materials including alumina, for example.

The write coil 59 is coiled around the yoke 82 of the write head 58. During a write operation, electrical current is directed from the controller 17 (not shown in FIG. 3B) through the write coil 59 in alternating directions. The current flows through the write coil 59 induces magnetic flux in the yoke 82. This produces a magnetic field at the write head gap 84 which extends toward the storage disk 16 during a write operation. The magnetic field interacts with the disk surface 30 forming a magnetic transition. Thus, information is written to the storage disk 16. Additionally, the write coil 59 generates a relatively substantial amount of heat in and around the write head 58.

The number of coil turns 94 in the write coil 59 can vary, but normally includes between nine and twelve coil turns 94. In FIG. 3B, the write coil 59 includes nine coil turns 94. The write coil 59 can be arranged to form two layers of coil turns 94, as illustrated in FIG. 3B. Alternatively, the write coil 59 can include more or less than two layers of coil turns 94. A first layer of coil turns 94 of the write coil 59 is positioned adjacent to the first insulator layer 90.

The second insulator layer 92 covers the first layer of coil turns 94 of the write coil 59, and a second layer of coil turns 94 is then connected to the first layer of coil turns 94 to form a continuous write coil 59. The second insulator layer 92 is again added to surround and electrically insulate the second layer of coil turns 94, as shown in FIG. 3B. A portion of the second insulator layer 92 is positioned within the interpole region 88. The second insulator layer 92 can be formed from various materials such as photoresist, as one example.

The overcoat layer 74 is a relatively thick layer of material that covers the trailing pole 78, the second insulator layer 92, and all of the layers from the second insulator layer 92 to the first shield 68. The overcoat layer 74 extends to form the trailing surface 46 of the slider assembly 22, as illustrated in FIG. 3B. The overcoat layer 74 protects and electrically insulates the write head 58 and the other layers in the transducer section 54 from direct contact by any materials such as dust or other particulates. The overcoat layer 74 can be formed from various materials such as alumina, for example. The thickness of the overcoat layer 74 can vary, but is generally between 15 and 25 microns.

As provided previously, current is directed through the write coil 59 in continuously alternating directions during writing to the storage disk 16. The electrical resistance of the write coil 59 generates heat that is transferred to nearby areas of the transducer section 54, resulting in thermal expansion, e.g. protrusion of the pole tips 80, 86, and the immediately surrounding overcoat layer 74.

FIG. 3B also illustrates that the slider assembly 22 includes the heat dissipater 60 that transfers heat away from the write coil 59 during a write operation. In particular, the heat dissipater 60 distributes heat from the write coil 59 away from the pole tips 80, 86, and the immediately surrounding overcoat layer 74, into other more remote regions of the overcoat layer 74. Stated another way, heat that would otherwise cause protrusion of the transducer section 54 toward the storage disk 16 is dissipated into less critical areas of the slider assembly 22. With this design, thermal protrusion is substantially reduced.

The positioning, composition and geometry of the heat dissipater 60 can vary to suit the design requirements of the slider assembly 22 and the disk drive 10. In the embodiment illustrated in FIG. 3B, the heat dissipater 60 is substantially positioned within the overcoat layer 74. In this embodiment, the heat dissipater 60 is a planar layer that is substantially parallel to the leading pole 76. The heat dissipater 60 can also be positioned in alternative ways that are not parallel to the leading pole 76. Moreover, although the heat dissipater illustrated in FIG. 3B extends to the air bearing surface 48 of the exterior slider surface 40, other embodiments include a completely interior, unexposed heat dissipater 60 that does not extend to the air bearing surface 48, and is positioned wholly within the slider interior region 42.

Moreover, FIG. 3B illustrates that the heat dissipater 60 can be in relatively close proximity to the write coil 59 and the trailing pole 78, provided the heat dissipater 60 is substantially not in electrical contact with the write coil 59, the poles 76, 78 and the yoke 82. The distance between the heat dissipater and the write coil can be up to 25 microns. In one embodiment, the closest distance between the heat dissipater and the write coil is between 0.5 and 5.0 microns. Further, in another embodiment, the heat dissipater 60 only contacts other components of the slider assembly 22 having a thermal conductivity of less than 25 W/mK. In still another embodiment, the heat dissipater 60 only contacts other components of the slider assembly 22 having a thermal conductivity of less than 5 W/mK.

The heat dissipater 60 is substantially electrically isolated from the drive circuitry e.g. the heat dissipater 60 is not in direct contact with the write coil 59 or the MR head 57, nor is there any significant electrical coupling between the heat dissipater 60 and the write coil 59. In general, the closer the heat dissipater 60 can be positioned to the write coil 59 while avoiding electrical communication with the drive circuitry, the more effective the heat dissipater 60 is at transferring heat away from the write coil 59, thereby decreasing thermal protrusion.

The heat dissipater 60 has a surface area that can be substantially entirely enclosed within the slider interior region 42. Alternatively, the surface area of the heat dissipater 60 can be greater than approximately 95 percent enclosed within the slider interior region 42. Still further, the surface area of the heat dissipater 60 can be greater than approximately 75 percent enclosed within the slider interior region 42. In yet another embodiment, the surface area of the heat dissipater 60 can be greater than 50 percent enclosed within the slider interior region 42.

The heat dissipater 60 can be formed from a suitable material that has a relatively high thermal conductivity. Materials of high thermal conductivity are most effective at distributing heat away from the write coil 59. For example, to increase effectiveness, the thermal conductivity of the heat dissipater 60 is at least approximately 50 watts per meter degree Kelvin (W/mK). In one embodiment, the thermal conductivity is at least approximately 100 W/mK. In another embodiment, the thermal conductivity is at least approximately 200 W/mK. In still another embodiment, thermal conductivity is at least approximately 300 W/mK. Examples of materials that satisfy these desired thermal conductivity ranges, along with their approximate thermal conductivity values, include aluminum (237 W/mK), gold (317 W/mK), copper (401 W/mK) and silver (429 W/mK). Alternately, other suitable materials having thermal conductivities in the ranges provided herein can be used as the heat dissipater 60.

The thickness of the heat dissipater 60 can vary, provided the thickness is sufficient to dissipate heat generated by the write coil 59 during a write operation. For example, the thickness can be greater than approximately 0.1 microns. For increased heat transfer, the thickness can be approximately between 1.0 and 5.0 microns or greater.

Further, the heat dissipater 60 can have a height dimension that extends into the slider interior region 42 at least as far as the uppermost coil turns 94. Preferably, the heat dissipater 60 extends from near the air bearing surface 48, in a direction toward the slider interior region 42, to approximately one-fourth to one half the total height of the slider assembly 22. Alternately, the height of the heat dissipater 60 can be more than one-half or less than one-fourth of the height of the slider assembly 22.

Additionally, the width of the heat dissipater 60 can extend laterally at least as wide as the widest coil turn 94 of the write coil 59 in order to maximize dissipation effectiveness. For example, the heat dissipater 60 can extend from one-sixth to one-half of the width of the slider assembly 22. Alternately, the width of the heat dissipater 60 can be more than one-half or less than one-sixth of the width of the slider assembly 22.

It should be recognized that the embodiment illustrated in FIGS. 3A and 3B is a single example of the various layering configurations, and that other suitable layering configurations can be utilized with the present invention.

Figure 4:
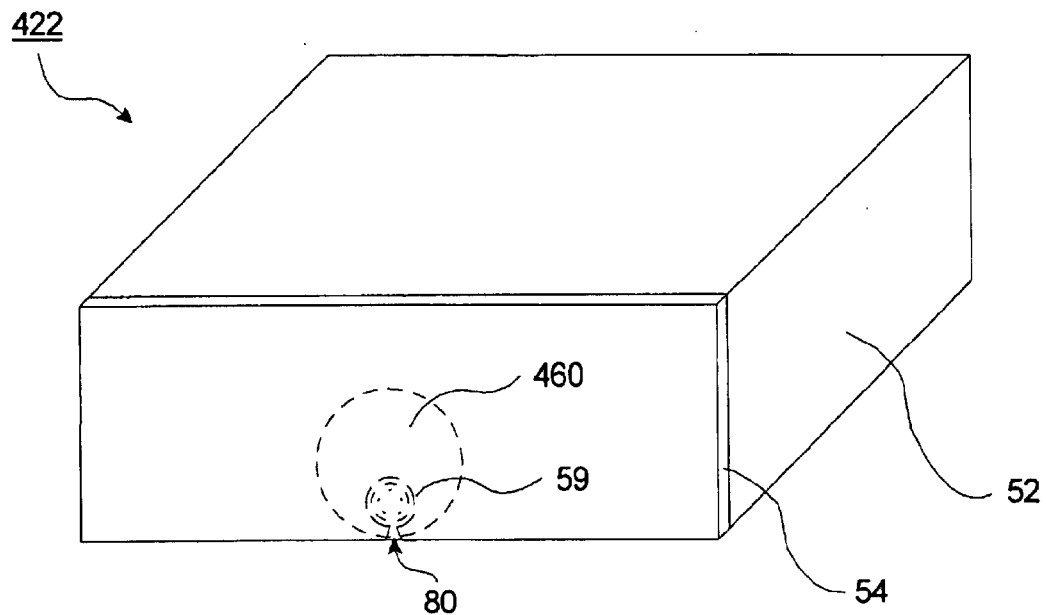
FIG. 4 is a perspective view of yet another embodiment of a slider assembly having features of the present invention.

FIG. 4 illustrates a slider assembly 422 having an alternatively configured heat dissipater 460 (shown in phantom) that is substantially disk shaped. In this embodiment, the heat dissipater 460 can have a thickness that is substantially similar to the heat dissipater 60 described previously. The heat dissipater 460 can be positioned within the transducer section 54, as illustrated in FIG. 4. Alternatively, the heat dissipater 460 can be positioned within the body section 52. The heat dissipater 460 mimics the general shape of an enlarged write coil 59. In this embodiment, the diameter of the heat dissipater can vary, although the heat dissipater 460 can have a diameter that is approximately one to five times the outside diameter of the write coil 59. The heat dissipater 460 can alternatively be elliptical, semi-circular, trapezoidal or any other configuration that dissipates heat generated by the write coil 59 (shown in phantom) away from the transducer section 54 near the trailing pole tip 80 and adjacent areas of the slider assembly 422.

Figure 5:
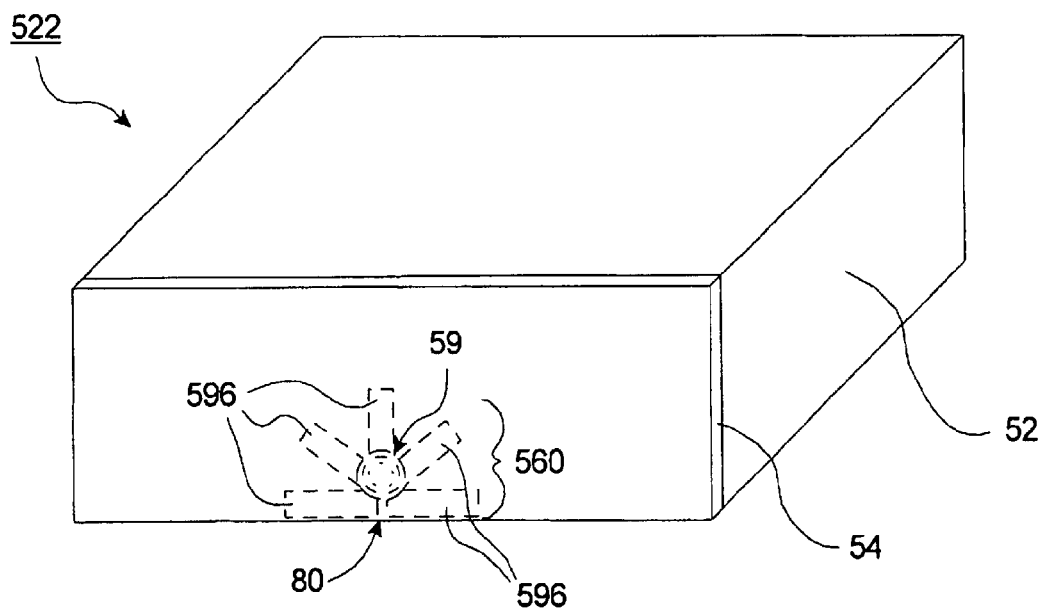
FIG. 5 is a perspective view of still another embodiment of a slider assembly having features of the present invention.

FIG. 5 illustrates still another embodiment of a heat dissipater 560 (shown in phantom) in the slider assembly 522. In this embodiment, the heat dissipater 560 can have a thickness that is substantially similar to other heat dissipaters 60, 460, described herein. The heat dissipater 560 can be positioned within the transducer section 54, as illustrated in FIG. 5. Alternatively, the heat dissipater 560 can be positioned within the body section 52. In this embodiment, the heat dissipater 560 includes a plurality of dissipater projections 596 that generally extend radially from near the write coil 59 (shown in phantom) in a direction away from the trailing pole tip 80. Although FIG. 5 shows the heat dissipater 560 having five generally planar-shaped dissipater projections 596, any number of dissipater projections 596 can be utilized. Further, the positioning, size and shape of each projection 596 can vary as needed to better dissipate heat generated by the write coil 59. With this design, a greater surface area of the heat dissipater 560 is achieved, which promotes a more secure bonding between the heat dissipater 560 and other adjacent layers of the slider assembly 522. In addition, this embodiment of the slider assembly 522 reduces eddy currents that may exist in the head dissipater 560 due to capacitive or inductive coupling to the write coil 59

Figure 6:
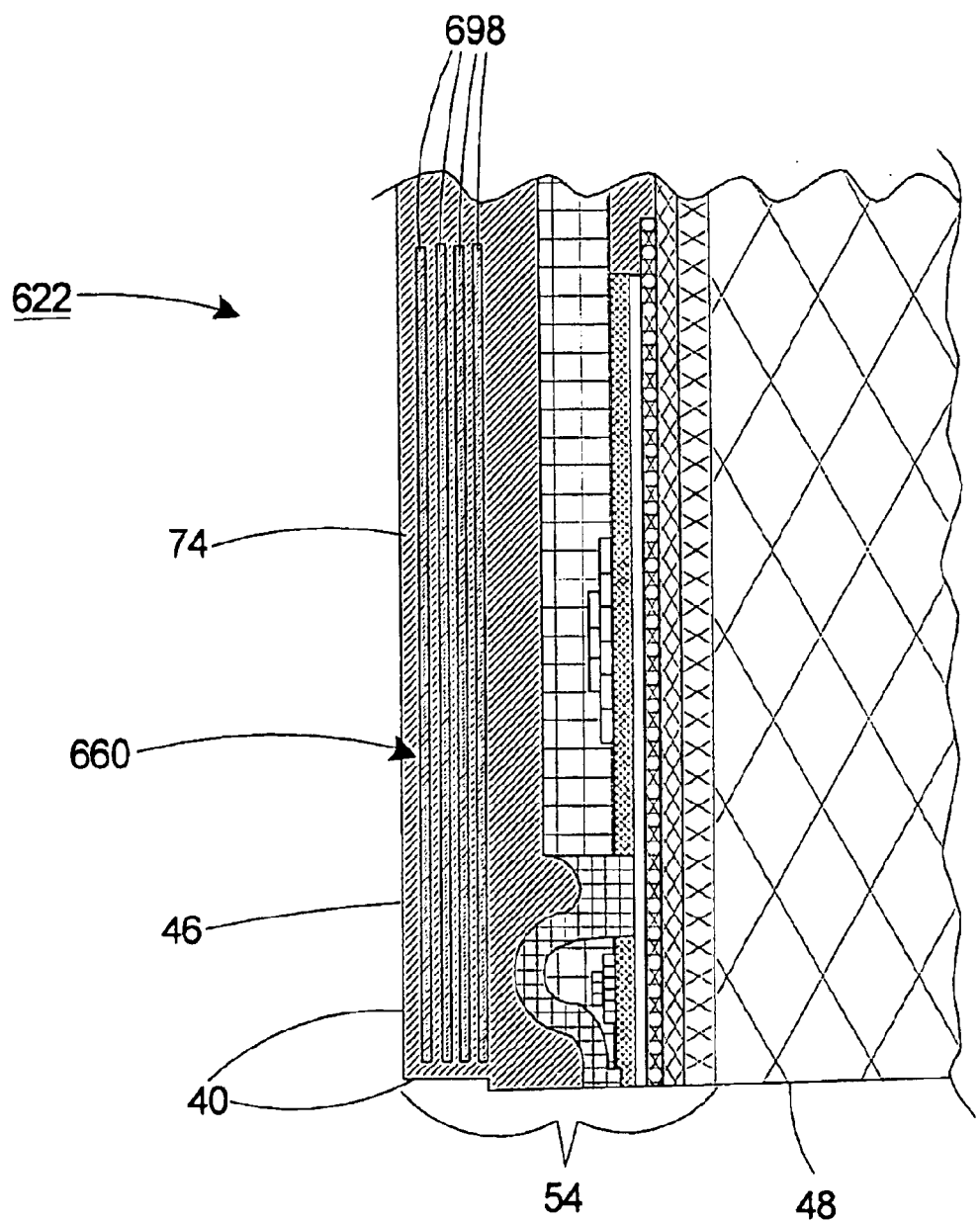
FIG. 6 is a partial cross-sectional view of another embodiment of the slider assembly.

FIG. 6 illustrates yet another embodiment of a heat dissipater 660 in the slider assembly 622. In this embodiment, the heat dissipater 660 includes a plurality of spaced-apart dissipater layers 698 positioned within the transducer section 54. Further, between each dissipater layer 698 is a relatively thin layer which can be formed from alumina. Alternatively, other materials can be used between the dissipater layers 698. The number of dissipater layers 698 can vary. FIG. 6 shows the heat dissipater having four dissipater layers 698. The dissipater layers 698 in this embodiment can vary in positioning, composition and size. This design is also useful for reducing eddy current formation in the dissipater layers 698 by reducing the electrical conduction, path length perpendicular to the dissipater layers 698 compared to a single layer of total thickness equal to the sum of the dissipater layer 698 thicknesses.

Although the heat dissipater 660 illustrated in FIG. 6 does not extend to the air bearing surface 48 of the exterior slider surface 40, other embodiments of the heat dissipater 660 can fully extend to reach the air bearing surface 48. As illustrated in FIG. 6, the heat dissipater 660 can have two or more dissipater layers 698 that are substantially parallel to each other, although this configuration is not required. Further, at least one of the dissipater layers 698 can be substantially parallel to the trailing surface 46. The heat dissipater 660 can have layers 698 of differing thicknesses and of differing materials. For example, the dissipater layers 698 can alternate between a thicker (i.e. 100 nanometers) layer of aluminum and a thinner (i.e. 1.0 nanometer) layer of alumina. Although the material used can vary, at least one of the materials used in the heat dissipater 660 has a thermal conductivity consistent with the ranges provided previously herein.

Moreover, although the embodiments illustrated herein show the heat dissipater 60 incorporated substantially within the overcoat layer 74 of the transducer section 54, it is recognized that the heat dissipater 60 can be positioned either partly or entirely outside the overcoat layer 74. For example, the heat dissipater 60 can be positioned partly or entirely in the undercoat layer 66, the body section 52, and/or other regions of the slider assembly 22.

While the particular slider assembly 22 and disk drive 10, as herein shown and disclosed in detail, is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A disk drive, comprising:
a controller that directs current; and
a slider assembly that receives current directed by the controller, the slider assembly including (i) a write coil that is in electrical communication with the controller, the write coil generating heat during a write operation, and (ii) a heat dissipater that dissipates heat generated by the write coil, the heat dissipater having a thermal conductivity of at least approximately 50 W/mK, the heat dissipater being electrically isolated from the controller and isolated from contact with any material having a thermal conductivity of greater than approximately 25 W/mK.

2. The disk drive of claim 1 wherein the heat dissipater has a thermal conductivity of at least approximately 200 W/mK.

3. The disk drive of claim 1 wherein the heat dissipater has a thermal conductivity of at least approximately 300 W/mK.

4. The disk drive of claim 1 wherein the slider assembly includes a trailing surface, and wherein the heat dissipater is positioned substantially between the write coil and the trailing surface.

5. The disk drive of claim 4 wherein the heat dissipater is positioned greater than approximately 0.1 microns from the write coil, but not greater than approximately 25 microns from the write coil.

6. The disk drive of claim 4 wherein the heat dissipater is positioned greater than approximately 0.5 microns from the write coil, but not greater than approximately 5 microns from the write coil.

7. The disk drive of claim 1 wherein the heat dissipater has a thickness of greater than approximately 0.1 microns, but less than approximately 5 microns.

8. The disk drive of claim 1 wherein the heat dissipater has a thickness of greater than approximately 0.5 microns, but less than approximately 3 microns.

9. The disk drive of claim 1 wherein slider assembly includes a trailing surface, and the heat dissipater is substantially planar and is positioned substantially parallel to the trailing surface.

10. The disk drive of claim 9 wherein the heat dissipater is substantially semi-circular in shape.

11. The disk drive of claim 9 wherein the heat dissipater includes a plurality of substantially flat, radial projections, at least one projection having a first end positioned near the write coil and a second end positioned away from the write coil.

12. The disk drive of claim 11 wherein the projections are substantially coplanar.

13. The disk drive of claim 1 wherein the heat dissipater is substantially circular in shape.

14. The disk drive of claim 1 wherein the heat dissipater is substantially elliptical in shape.

15. The disk drive of claim 1 wherein the heat dissipater is formed substantially from copper.

16. The disk drive of claim 1 wherein the heat dissipater is composed substantially from aluminum.

17. The disk drive of claim 1 wherein the heat dissipater includes a plurality of spaced apart, substantially planar dissipater layers.

18. The disk drive of claim 17 wherein at least two of the dissipater layers are substantially parallel.

19. The disk drive of claim 17 wherein the slider assembly includes a trailing surface, and at least one of the dissipater layers is substantially parallel to the trailing surface.

20. The disk drive of claim 1 wherein the heat dissipater is not electrically connected to any portion of the disk drive.

21. The disk drive of claim 1 wherein the slider assembly has a slider exterior surface, and wherein no portion of the heat dissipater extends to the slider exterior surface.

22. The disk drive of claim 1 wherein the slider assembly includes a trailing surface, and at least a portion of the heat dissipater is positioned between the write coil and the trailing surface.

23. A disk drive, comprising:
a controller; and
a slider assembly that is electrically connected to the controller, the slider assembly having a slider exterior surface that includes a trailing surface, the slider exterior surface defining a slider interior region, a write head having a write coil that is in electrical communication with the controller, the write coil being positioned within the slider interior region, the write coil generating heat, and a heat dissipater positioned substantially between the trailing surface and the write coil, the heat dissipater having a thermal conductivity of at least approximately 200 W/mK, the heat dissipater being electrically isolated from the controller, the heat dissipater dissipating heat generated by the write coil.

24. The disk drive of claim 23 wherein the heat dissipater has a thermal conductivity of at least approximately 300 W/mK.

25. The disk drive of claim 23 wherein a portion of the heat dissipater is positioned greater than approximately 0.5 microns from the write coil, but not greater than approximately 5 microns from the write coil.

26. The disk drive of claim 23 wherein the heat dissipater has a thickness of greater than approximately 0.5 microns, but less than approximately 3 microns.

27. The disk drive of claim 23 wherein the heat dissipater is substantially planar in shape.

28. The disk drive of claim 23 wherein the heat dissipater includes a plurality of substantially coplanar radial projections, at least one projection having a first end positioned near the write coil and a second end positioned away from the write coil.

29. The disk drive of claim 23 wherein the heat dissipater is substantially disk shaped.

30. The disk drive of claim 23 wherein the heat dissipater is formed substantially from copper.

31. The disk drive of claim 23 wherein the heat dissipater is composed substantially from aluminum.

32. The disk drive of claim 23 wherein the heat dissipater includes a plurality of spaced apart, substantially planar dissipater layers.

33. The disk drive of claim 32 wherein at least two of the dissipater layers are substantially parallel to one another.

34. The disk drive of claim 23 wherein no portion of the heat dissipater extends to the slider exterior surface.

35. A method for dissipating heat generated by a write coil within a slider assembly of a disk drive, the slider assembly including a read head, a write head, a trailing surface and a slider interior region, the disk drive including a controller that directs current to the read head and the write head, the method comprising the steps of:
positioning a heat dissipater substantially within the slider interior region including positioning at least a portion of the heat dissipater between a write coil of the write head and the trailing surface, the heat dissipater having a thermal conductivity of at least approximately 50 W/mK; and
electrically isolating the heat dissipater from the controller.

36. The method of claim 35 wherein the step of positioning a heat dissipater includes positioning the heat dissipater near the write coil.

37. The method of claim 35 wherein the step of positioning the heat dissipater includes providing a heat dissipater having a thermal conductivity of at least approximately 200 W/mK.

38. The method of claim 35 wherein the step of positioning the heat dissipater includes providing a heat disspater having a thermal conductivity of at least approximately 300 W/mk.

39. The method of claim 35 wherein the step of positioning a heat dissipater includes isolating the heat dissipater from contact with any material having a thermal conductivity of greater than approximately 25 W/mK.

40. The method of claim 35 wherein the step of positioning a heat dissipater includes depositing a portion of the heat dissipater within approximately 5 microns from the write coil between the write coil and the trailing surface.

41. The method of claim 35 wherein the step of electrically isolating the heat dissipater includes electrically decoupling the heat dissipater from all portions of the disk drive.

42. The method of claim 35 wherein the step of positioning the heat dissipater includes positioning the entire heat dissipater within a slider interior so that no portion of the heat dissipater extends to a slider exterior surface of the slider assembly.

43. The method of claim 35 wherein the step of positioning the heat dissipater includes positioning the entire heat dissipater substantially between the write coil and the trailing surface of the slider assembly.

44. A method of manufacturing a disk drive, the method comprising the steps of:
directing current to a slider assembly with a controller; and
providing a slider assembly that receives current that is directed by the controller, the slider assembly including (i) a write coil that is in electrical communication with the controller, the write coil generating heat during a write operation, and (ii) a heat dissipater that dissipates heat generated by the write coil during a write operation, the heat dissipater having a thermal conductivity of at least approximately 50 W/mK, the heat dissipater being electrically isolated from the controller and isolated from contact with any material having a thermal conductivity of greater than approximately 25 W/mK.

45. The method of claim 44 wherein the heat dissipater has a thermal conductivity of at least approximately 200 W/mK.

46. The method of claim 44 wherein the heat dissipater has a thermal conductivity of at least approximately 300 W/mK.

47. The method of claim 44 wherein the step of providing a slider assembly includes depositing the heat dissipater near the write coil.

48. The method of claim 44 wherein the step of providing a slider assembly includes depositing the heat dissipater in a plurality of substantially planar, spaced apart dissipater layers.

49. The method of claim 44 wherein the step of providing a slider assembly includes depositing the heat dissipater in a substantially planar layer.

50. The method of claim 44 wherein the step of providing a slider assembly includes depositing the heat dissipater so that the heat dissipater includes a plurality of substantially radial projections, wherein at least one projection has a first end positioned near the write coil and a second end positioned away from the write coil.

51. The method of claim 44 wherein the step of providing a slider assembly includes depositing the heat dissipater so that the heat dissipater is not electrically connected to any components of the disk drive.

52. The method of claim 44 wherein the step of providing a slider assembly includes positioning at least a portion of the heat dissipater substantially between the write coil and a trailing surface of the slider assembly.

53. The method of claim 44 wherein the step of providing a slider assembly includes positioning the entire heat dissipater substantially between the write coil and a trailing surface of the slider assembly.

* * * * *